March 22, 1966   R. J. VON FLUE ETAL   3,241,813
TURBINE WHEEL BURST CONTAINMENT MEANS
Filed Jan. 21, 1964   2 Sheets-Sheet 1
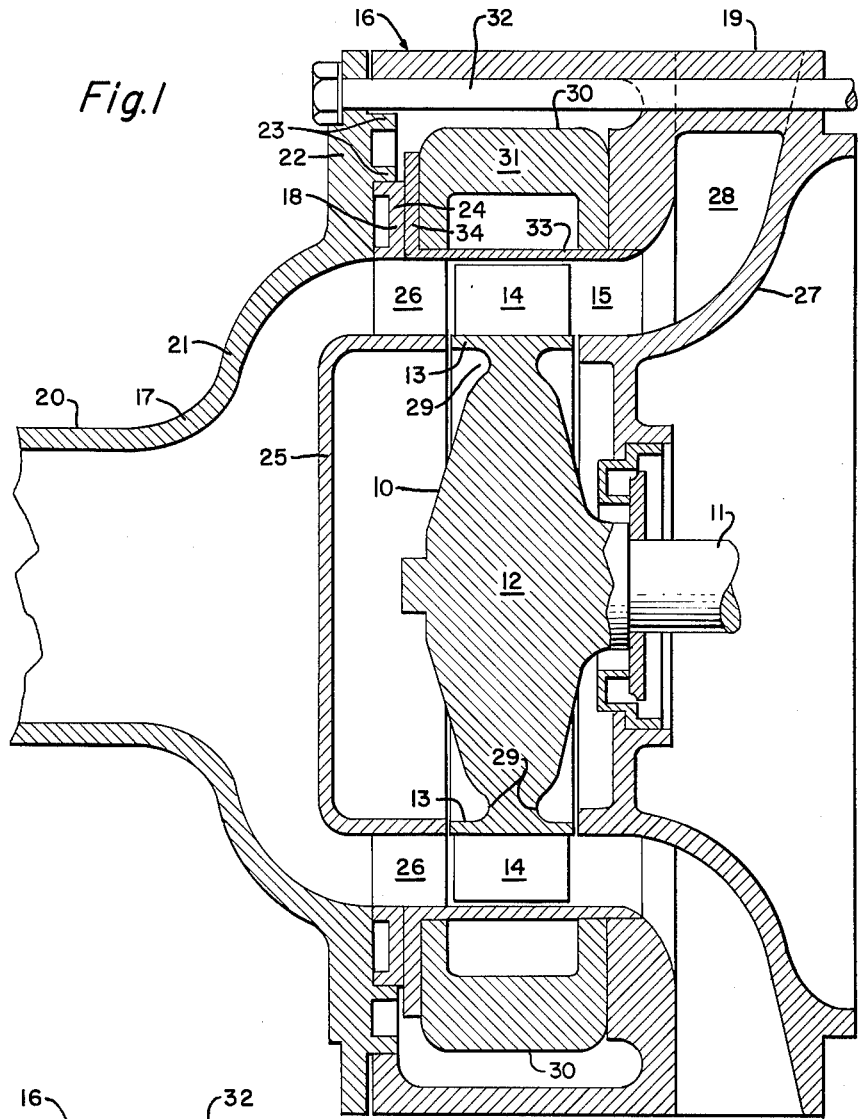
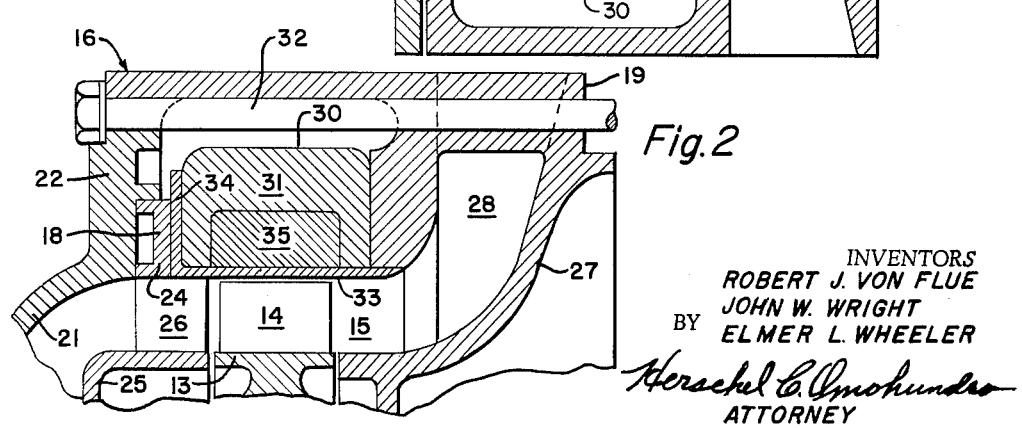
INVENTORS
ROBERT J. VON FLUE
JOHN W. WRIGHT
ELMER L. WHEELER
BY
Herschel C. Omohundro
ATTORNEY March 22, 1966  R. J. VON FLUE ETAL  3,241,813
TURBINE WHEEL BURST CONTAINMENT MEANS
Filed Jan. 21, 1964  2 Sheets-Sheet 2

INVENTORS
ROBERT J. VON FLUE
JOHN W. WRIGHT
ELMER L. WHEELER
BY
Herschel C. Omohundro
ATTORNEY United States Patent Office 3,241,813
Patented Mar. 22, 1966

3,241,813
TURBINE WHEEL BURST CONTAINMENT MEANS
Robert J. Von Flue and John W. Wright, Phoenix, and Elmer L. Wheeler, Tempe, Ariz., assignors to The Garrett Corporation, Los Angeles, Calif., a corporation of California
Filed Jan. 21, 1964, Ser. No. 339,182
14 Claims. (Cl. 253—39)

This invention relates generally to high-speed rotary machines and protective apparatus for use therewith. More particularly, this invention relates to means for receiving and retaining fragments thrown from rotors which have disintegrated under centrifugal forces imposed by high-speed rotation. Still more particularly, the invention relates to containment means to be incorporated in a turbine-type machine in which the rotor is driven by gases sometimes difficult to control, or the failure of some part may cause uncontrolled operation of the rotor with the result that the turbine wheel may be driven to destruction by internal forces.

In the turbomachinery field, it is well known that the rotary parts of turbine engines may sometimes be subjected to extremely high centrifugal forces which could cause the bursting of rotors at their most highly stressed regions or in portions where some mechanical flaw exists. When a rotor operating at high speed bursts, the fragments may be thrown generally outwardly in the plane of rotation of the rotor with forces which are, in effect, similar to those of high-energy projectiles, and the fragments could, if not prevented, cause extensive damage to the turbine and adjacent structure and injury to attending personnel.

An object of this invention is to utilize this knowledge in providing an improved means for effectively containing fragments of a rotor which has burst during high-speed operation and thus prevent serious damage to associated structure.

A two-fold object of this invention is, first, to construct a turbine wheel so that the speed and place at which it will fail can be accurately predicted, and second, to provide means for containing the fragments resulting from such failure, the previous knowledge of the forces of the fragments resulting from the anticipated failure permitting the design of containment means which will afford the maximum protection and yet add a minimum of weight to the completed unit.

Another object of this invention is to provide means for receiving rapidly moving fragments from a burst rotating element, absorbing the kinetic energy of the fragments and retaining them within the unit to prevent damage to other mechanism.

Another object of the invention is to provide a turbine wheel burst containment means having an annular shield element of channel-shaped cross section so supported in wheel-surrounding relationship that, upon a burst of the wheel, the fragments will be caught in and confined to the channel of the shield, and the latter will be caused to rotate to a limited extent by the rotary forces of the fragments, whereby the energy of the fragments will be dissipated and threatened damage avoided.

Another object of the invention is to provide the containment means mentioned in the previous paragraph with a wheel shroud which closes the channel during normal operation of the turbine and which is formed of a material capable of resisting high temperature and corrosion effects of cartridge gases but which is thin enough to be penetrated by the wheel fragments whereby some of the energy contained in the fragments will be spent before the fragments engage the shield proper, both shield and shroud being frictionally held so that some kinetic energy of the fragments may be dissipated by imparting turning movement thereto.

Still another object of this invention is to provide a turbine wheel burst containment means having a strong annular shield element surrounding and spaced from the wheel and a second annular element of softer material lining the shield element, both elements being so mounted that fragments flying from the wheel after it has burst will impart rotary motion to the annular elements to dissipate the kinetic energy of the fragments, the softer material of the lining being such that the fragments will be embedded in, fused to, and/or gripped thereby, and thus prevented from passing from the turbine casing.

Other objects and advantages of the invention will be made apparent by the following description of some forms of wheel containment means selected for illustration in the accompanying drawings, in which:

FIG. 1 is an axial sectional view of the turbine end of a high-speed rotary machine with a containment device embodying the principles of the invention incorporated therein;

FIG. 2 is a fragmentary axial section view of a similar machine with a slightly modified form of containment means;

Figure 3:
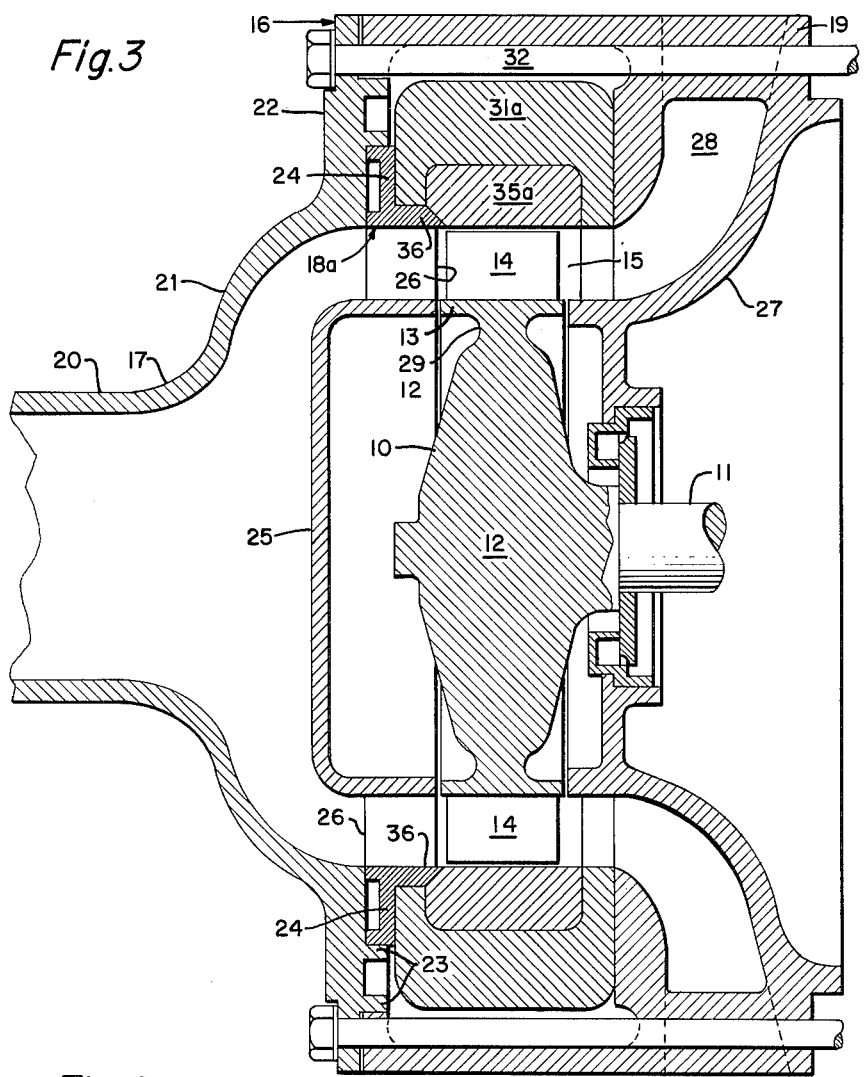
FIG. 3 is a view similar to FIG. 1, showing a further modified form of containment device.

Referring more particularly to FIG. 1, the turbine end of the high-speed rotary machine shown therein includes a turbine wheel 10 formed with or mounted on the end of a shaft 11. This shaft is journaled in suitable bearings, not shown, for high-speed rotation. The turbine wheel includes a disk body portion 12 with an annular platform 13 at the periphery from which blades 14 project in a generally radial direction. These blades are positioned in a gas passage 15 which is of annular cross section at the location of the turbine wheel so that the blades of the wheel will be disposed therein and extend substantially across the passage. The passage is formed in a casing 16 forming a part of the high-speed rotary machine.

In all forms of the invention shown, the casing includes a plurality of pieces 17, 18 and 19, piece 17 having a tubular gas inlet portion 20 which is flared, as at 21, the end of the flared portion being provided with a flange 22. On the opposite side of the flange 22 from the tubular inlet portion 20 there are provided inner and outer annular reinforcing and positioning ribs 23, these ribs being finished to provide locating shoulders for casing pieces 18 and 19. Piece 18 is of generally circular formation and includes an outer ringlike portion 24 which is disposed within the inner annular rib 23 to be located thereby with a central pan-shaped wall 25 formed with the piece 18 disposed in the flared portion of the piece 17. This pan-shaped wall is connected with the ringlike portion 24 by a plurality of nozzle vane elements 26 which are suitably shaped and oriented to direct gases flowing through the passage 15 in suitable directions to engage the wheel blades 14 and impart rotary movement to the turbine wheel. The wall 25 imparts the annular shape to the inlet end of the passage 15. Part 19 of the casing is of a cylindrical shape and is engaged with the shoulder provided by outer rib 23 on casing part 17. Casing part 19 includes an inwardly projecting annular portion 27 in which the outlet end 28 of the passage 15 is formed, this outlet end turning from an axial to a radial direction and leading to a suitable gas discharge region.

Between the inlet and outlet ends of the passage 15 formed by the wall 25 and portion 27, the platform 13 on the turbine wheel provides a movable inner wall for the passage. The outer wall of this portion of the passage is provided by the containment means, indicated generally by the numeral 30, of the present invention.

As indicated in the objects, it has been found desirable to design the turbine wheel so that, in the event a wheel burst should occur, it will take place at a predetermined wheel speed, and the containment means can then be constructed to receive and retain wheel fragments resulting from such wheel burst, the maximum size, force of the fragments, etc., being readily predictable. In some instances, the wheel blades have been shaped and sized so that they will fail and be thrown from the wheel by centrifugal force at the predetermined wheel speed. In such case, the containment means is constructed to catch and retain the blades. In another instance, the disk body of the wheel is weakened adjacent the platform (for example, by reducing the thickness of the disk, as at 29 in FIG. 1) so that at a predetermined wheel speed the platform or parts thereof will separate from the disk body and be caught and retained by the containment means. When the blades or the platform fragments with blades thereon leave the wheel, it will be prevented from further acceleration. By being able to predict a wheel burst, the size, material and manner of constructing the containment means can be selected to secure the maximum safety with the minimum weight.

In the first form of the invention, shown in FIG. 1, the containment means 30 includes an annular shield 31 having a channel-shaped cross section with the open side of the channel facing inwardly. The shield is formed of a suitable material, preferably a metal having the ability to resist the impact of the wheel fragment without fracture. Experience has demonstrated that shields constructed of titanium have been satisfactory. The channel-shaped shield is desirable as the flanges serve to guide the fragments following the initial burst and assist in retaining them in the containment means. The shield is frictionally clamped in the casing by disposing it between casing pieces 17, 18 and 19, and securing the casing in assembled relationship with bolts, screws or similar fastening devices 32. To operate the turbine, a fluid, such as air or other gases, under pressure, is supplied to the inlet 20 and caused to flow through the passage 15. This fluid is so directed against the blades by the nozzle vanes 26 and the blades 14 are so formed that rotary motion will be imparted to the wheel.

It is obvious that more efficiency will be secured from the turbine if a shroud 33 is provided around the end portions of the blades so that the channel of the shield will be covered. When the turbine is to be operated by hot gases, such as are developed by burning a cartridge, the shroud 33 is formed of a material which will resist the high temperature as well as corrosive erosive effects of such gases. The shroud 33 (shown in FIGS. 1 and 2) is formed with a flange 34 at one end, which is arranged between the ring portion 24 of the casing piece 18 and the side of the shield 31. The forces which clamp the shield also frictionally hold the shroud. Since no fastening elements extend through either the shroud or the shield, these members may turn when a force sufficient to overcome the clamping forces is exerted thereon. The shroud extends across the flanges of the shield and is supported thereby. Both shroud and shield are guided for rotary movement by the casing pieces 18 and 19. When a wheel burst occurs, the resulting fragments break through the portion of the shroud extending across the shield channel and engage the bottom wall of the channel. Some of the force of the fragments will be dissipated in breaking the shroud and the rest will be absorbed by the shield. In some cases the fragments will tend to transmit rotary movement to either the shroud, the shield, or both of these members. The frictional clamping permits this action to take place and the energy of the fragments will be dissipated.

It has been found desirable, under certain circumstances, to provide the channel of the shield with a material for further absorbing the energy of the fragments and retaining them in the machine. As shown in FIG. 2, the shield channel may be lined with a suitable material 35 before the shroud is installed. An example of a suitable material is aluminum. It is softer than the material of the shield and will permit some penetration by the wheel fragments. Following such penetration, the liner will resist the release of the fragments. It is desirable to make the liner thick enough to prevent the fragments from passing completely through it and engaging the inner surface of the shield. Such engagement might cause the fragments to rebound and be thrown from the casing.

In the event the turbine is to be operated by compressed air or other relatively cool gases, the shroud 33 may be omitted, as shown in FIG. 3. In the turbomachine shown in this figure, the shield 31a has a liner 35a, the inner surface of which functions as a shroud. In this modification, casing piece 18a has flange 36 which partly overlaps the forward end of the liner 35a and provides a smooth surface for the gas passage. The flange at the rear end of the shield terminates flush with the liner surface and forms a part of the gas passage wall. As in the form of the invention shown in FIG. 2, the liner 35a is made thick enough to preclude complete penetration by the wheel fragments.

By constructing the liner of relatively soft, low-melting-point material, a better fragment retention can be secured. It has been found through tests that when the liner is made of a soft metal with a relatively low melting point, the friction between the fragments and the liner as the former move along the latter, before rotary movement can be imparted thereto, can develop sufficient heat to cause local softening of the liner whereby the fragments can penetrate and adhere thereto. Upon the cooling of the liner the fragments will be securely held.

Figure 4:
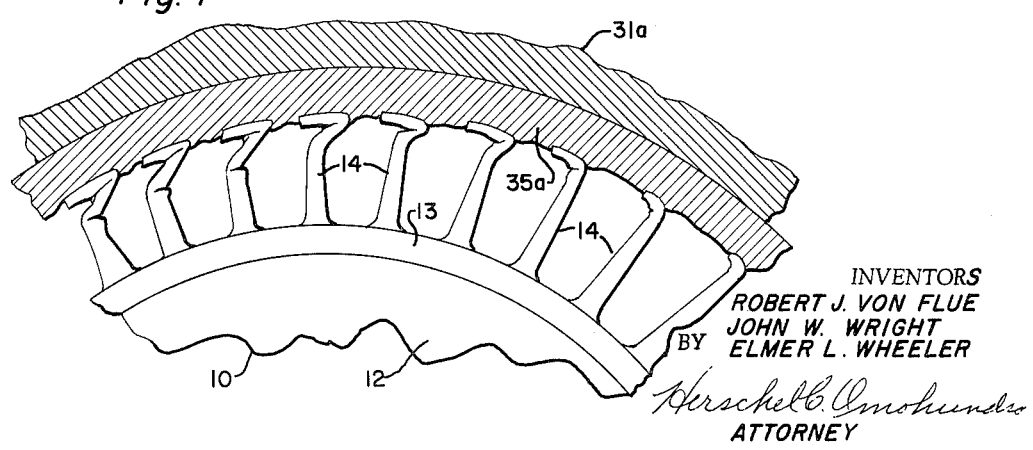
FIG. 4 is a fragmentary transverse sectional view on a larger scale taken through a portion of a containment device during or immediately following the burst of a turbine rotor.

A schematic sectional view of a portion of the containment means and wheel fragments immediately following a wheel burst is shown in FIG. 4. This view illustrates how the wheel blades frictionally move along the liner, scraping the surface, and as the wheel fragment moves outwardly the force causes the blades to collapse and bend over, increasing the area thereof in engagement with the liner. As the material becomes heated and softens, the blades will penetrate and stick thereto.

By weakening the wheel, as previously mentioned, the fragments will be caused to remain in larger pieces, which are more easily retained.

It will be obvious that the liner can be applied to the shield in any suitable manner; for example, in some test samples the liners were made in sections and welded into annular form in the liner. A more practical method would be to form the liner of a piece of tubular material and expand it by rolling into the channel of the shield. The liner fits closely into the channel of the shield, but is retained therein solely by friction. Relative rotary movement between these elements is thus possible and at times desirable.

We claim:
1. Means for containing the fragments of a rotatable element thrown therefrom by centrifugal force, comprising:
 (a) an annular shield member adapted to be disposed in the plane of rotation and in surrounding relationship to a rotatable element, said shield member having a grooved inner side facing the rotatable element when so disposed;
 (b) means for supporting said shield member adjacent the rotatable element solely by a frictional clamping arrangement which permits the shield to be at least partially rotated by forces imparted thereto by fragments of the rotatable element following a burst thereof; and
 (c) a solid metallic imperforate shroud means for closing the open side of said shield member during normal operation of the rotatable element.

2. Means for containing the fragments of a rotatable element upon a burst thereof due to centrifugal force, comprising:
   (a) an annular shield member adapted to be supported in the plane of rotation and in surrounding relationship to a rotatable element, said shield member being grooved on its inner side; and
   (b) an imperforate annular shroud member disposed within said shield member for closing the grooved inner side thereof, said members being relatively and separately rotatable about the axis of the rotatable element when so disposed; and
   (c) means for yieldably restraining said shield and shroud members against such rotation by predetermined forces.

3. Means for containing fragments of a rotatable element thrown therefrom by centrifugal force, comprising:
   (a) an annular shield member adapted to be disposed in the plane of rotation and in surrounding relationship to a rotatable element, said shield member having a grooved inner side facing the rotatable element when so disposed; and
   (b) a solid annular shroud member disposed within said shield member for closing the grooved inner side thereof, said shroud being formed of a material capable of withstanding the high temperature and corrosive effects of cartridge gases; and
   (c) means for supporting the shield and shroud in place adjacent the rotatable element solely by clamping to permit some rotary movement thereof in response to forces imparted by the fragments of the rotatable element following a burst thereof.

4. Means for containing fragments of a rotatable element thrown therefrom by centrifugal force, comprising:
   (a) an annular shield member adapted to be disposed in the plane of rotation and in surrounding relationship to a rotatable element, said shield member having inwardly directed flanges at the sides to provide a groove of a width exceeding the axial length of the adjacent portions of the rotatable element when the shield member is so disposed;
   (b) an imperforate annular shroud member engaging said flanges and extending across said groove to close the same, said shroud member being formed of a material capable of withstanding the high temperature and corrosive effects of cartridge gases and of a thickness which will permit penetration by fragments of the rotatable element; and
   (c) means for retaining said shield and shroud in place adjacent a rotatable element solely by clamping forces to permit some rotary movement thereof in response to forces imparted by the fragments of the rotatable element following a burst thereof.

5. In a gas turbine of the type having a rotatable wheel with blades at the periphery:
   (a) housing means having a plurality of sections providing gas inlet and outlet passages leading to and from said wheel blades; and
   (b) means for containing fragments of the wheel thrown therefrom by centrifugal force, said means having an annular shield member frictionally clamped at the side edges between sections of said housing means in the plane of rotation of and surrounding said wheel, the clamping arrangement being such that the shield may be rotated in response to forces imparted thereto by the wheel fragments, said shield having an internal groove facing inwardly toward the wheel.

6. In a turbine device:
   (a) a turbine wheel with a disk body having an annular platform and blades projecting radially from the periphery thereof, said disk body being weakened adjacent said platform to cause separation of at least a portion of the platform from the body under centrifugal force when the wheel exceeds a predetermined r.p.m.;
   (b) means for receiving and retaining fragments of the wheel thrown therefrom by centrifugal force, said means having an integral annular shield surrounding the wheel in the plane of rotation thereof, said shield being of channel-shaped cross section with the open side of the channel facing the wheel blades;
   (c) means for retaining said shield in place solely by clamping at the side edges to permit some rotary movement thereof in response to forces imparted by fragments of the wheel; and
   (d) an imperforate shroud means closing the open side of the shield during normal operation of the turbine wheel.

7. Means for containing the fragments of a rotatable element upon a burst thereof due to centrifugal force, comprising:
   (a) an integral annular shield member adapted to be supported in the plane of rotation and in surrounding relationship to a rotatable element, said shield member being grooved on its inner side; and
   (b) a second, substantially concentric, annular imperforate member disposed in the groove and supported by said shield member, said second member being formed of a relatively softer, lower-melting-point material than the shield member, both of said members being relatively and separately rotatable about the axis of the rotatable element when so supported; and
   (c) means for restraining said shield and second member against such rotation by predetermined forces which may be overcome by the forces of fragments of the rotatable element following a burst thereof.

8. Means for containing the fragments of a rotatable element upon a burst thereof due to centrifugal force, comprising:
   (a) an integral annular shield member adapted to be supported in the plane of rotation and in surrounding relationship to a rotatable element, said shield member having a channel-shaped cross section with the open side directed inwardly; and
   (b) a second annular imperforate member disposed in the channel of said shield member, said second member being formed of aluminum, both of said members being relatively and separately rotatable about the axis of the rotatable element when so supported and frictionally restrained against such rotation by predetermined forces which may be overcome by the forces of fragments of the rotatable element following a burst thereof.

9. Means for containing the fragments of a rotatable element upon a burst thereof due to centrifugal force, comprising:
   (a) an integral annular titanium shield member adapted to be supported in the plane of rotation and in surrounding relationship to a rotatable element; and
   (b) an imperforate liner in said shield member, said liner being formed of aluminum of a thickness sufficient to prevent complete penetration thereof by a fragment of predetermined mass moving at a predetermined velocity.

10. Means for containing the fragments of a rotatable element upon a burst thereof due to centrifugal force, comprising:
   (a) an integral annular titanium shield member adapted to be supported in the plane of rotation and in surrounding relationship to a rotatable element; and
   (b) an imperforate liner in said shield member, said liner being formed of a material having the characteristic of softening from friction caused by a sliding engagement therewith of a fragment of the rotatable element, said material also having the characteristic of quickly solidifying upon cessation of such sliding engagement, said liner being of a thickness sufficient to prevent complete penetration thereof by a fragment of predetermined mass moving at a predetermined velocity, said shield and liner being relatively and separately rotatable about the axis of the rotatable member when so supported and frictionally restrained against such rotation by predetermined forces which may be overcome by the forces of fragments of a rotatable element following a burst thereof.

11. Means for containing the fragments of a rotatable element upon a burst thereof due to centrifugal force, comprising:
 (a) an integral annular, high-strength shield member adapted to be supported in the plane of rotation and in surrounding relationship to a rotatable element;
 (b) a liner in said shield member, said liner being formed of a material having the characteristic of softening from friction caused by a sliding engagement therewith of a fragment of said rotatable element, said material also having the characteristic of adhering to such fragment upon cessation of such sliding engagement; and
 (c) means frictionally supporting said shield and liner for restrained rotation in response to forces imparted by fragments of the rotatable element moving under centrifugal forces following a burst thereof.

12. Means for containing the fragments of a rotatable element upon a burst thereof due to centrifugal force, comprising:
 (a) an integral relatively thick annular shield member adapted to be supported in surrounding relationship to a rotatable element in the plane of rotation thereof, said shield member having an inner groove and being of a width sufficient to extend a predetermined distance beyond the front and rear faces of the rotatable element when so supported;
 (b) means supporting said shield member for rotary movement about the axis of the rotatable element, said supporting means frictionally restraining said shield member with a predetermined force and permitting rotation when said force is exceeded; and
 (c) an imperforate liner substantially filling the groove in said shield, said liner being composed of a soft metal having a low melting point relative to said shield and being of a width sufficient to extend a limited distance beyond the front and rear faces of the rotatable element when supported adjacent the same.

13. In a gas turbine of the type having a rotatable wheel with blades at the periphery:
 (a) housing means having a plurality of sections providing gas inlet and outlet passages leading to and from said wheel blades;
 (b) means for containing the fragments of the wheel upon a burst thereof caused by centrifugal force, said means including an outer ring-shaped shield of high-strength material frictionally clamped at the sides between the sections of said housing means in the plane of rotation of and surrounding said wheel, said shield being guided by the housing for rotary movement in response to energy imparted by the wheel fragments upon a wheel burst; and
 (c) an inner imperforate ring-shaped member substantially confined at the periphery and side edges by said shield, the inner surface of said inner member being in close proximity to the peripheral edges of the wheel blades, said inner member being formed of a soft, low-strength material relative to the material of the wheel and shield and frictionally retained by the shield.

14. In a gas turbine of the type having a rotatable wheel with blades at the periphery:
 (a) housing means having a plurality of sections providing gas inlet and outlet passages leading to and from said wheel blades and gas nozzle locating means;
 (b) gas nozzle means supported at the inlet side of the wheel by said locating means, said gas nozzle means having shield locating means thereon;
 (c) means for containing the fragments of the wheel upon a burst thereof caused by centrifugal force, said means including an integral outer ring-shaped shield of high-strength material engaged with said shield locating means and frictionally clamped between portions of said gas nozzle means and said housing means; and
 (d) an imperforate inner ring-shaped member lining said shield, said inner member being formed of a soft material relative to the material of said shield, the mounting of said shield and inner member serving to allow limited rotary movement thereof relative to said housing means and to each other for the absorption of kinetic energy from wheel fragments moving under centrifugal forces.

References Cited by the Examiner

UNITED STATES PATENTS

| | | | |
|---|---|---|---|
| 2,494,328 | 1/1950 | Bloomberg. | |
| 2,879,936 | 3/1959 | Faught. | |
| 2,930,521 | 3/1960 | Koehring | 253—77 X |
| 2,987,296 | 6/1961 | Ferguson | 253—77 X |
| 2,999,667 | 9/1961 | Morley | 253—39 |
| 3,097,824 | 7/1963 | Bunger et al. | 253—77 |
| 3,126,149 | 3/1964 | Bowers et al. | 253—77 X |
| 3,146,992 | 9/1964 | Farrell | 253—39 |

SAMUEL LEVINE, *Primary Examiner.*

JULIUS E. WEST, *Examiner.*

E. A. POWELL, Jr., *Assistant Examiner.*